United States Patent
Itou et al.

(10) Patent No.: US 8,212,919 B2
(45) Date of Patent: Jul. 3, 2012

(54) IMAGE PROCESSING APPARATUS, IMAGE PROCESSING METHOD, AND PROGRAM

(75) Inventors: Hiroaki Itou, Kanagawa (JP); Yasunari Hatasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1258 days.

(21) Appl. No.: 11/876,420

(22) Filed: Oct. 22, 2007

(65) Prior Publication Data

US 2008/0111918 A1 May 15, 2008

(30) Foreign Application Priority Data

Nov. 10, 2006 (JP) ............................... P2006-305751

(51) Int. Cl.
*H04N 7/01* (2006.01)
(52) U.S. Cl. ......... 348/441; 348/459; 348/474; 348/608
(58) Field of Classification Search .................. 348/441, 348/459, 474, 608; 375/240.12; 386/205, 386/343, 345, 352
See application file for complete search history.

(56) References Cited

U.S. PATENT DOCUMENTS

2008/0219393 A1* 9/2008 Toma et al. ............ 375/E07.243

FOREIGN PATENT DOCUMENTS

JP 2003-189260 7/2003

* cited by examiner

*Primary Examiner* — Hunter B Lonsberry
(74) *Attorney, Agent, or Firm* — Finnegan, Henderson, Farabow, Garrett & Dunner, L.L.P.

(57) ABSTRACT

An image processing apparatus includes: a field forming unit configured to subject 3-2 pulldown materials to 3-2 pulldown to form field images in normal reproduction, and to add flag information to the field images, the flag information necessary to generate frame images from field images; and a generating unit configured to generate frame images from the formed field images based on the flag information, wherein in a special reproduction other than the normal reproduction, according to its reproduction form, the field forming unit forms a predetermined field image from the material, and adds flag information to the formed field images, the flag information that has to be added to a field image possibly formed by subjecting the material corresponding to the field image to 3-2 pulldown, and the generating unit generates a frame image from the field image based on the flag information added to the field image.

7 Claims, 14 Drawing Sheets

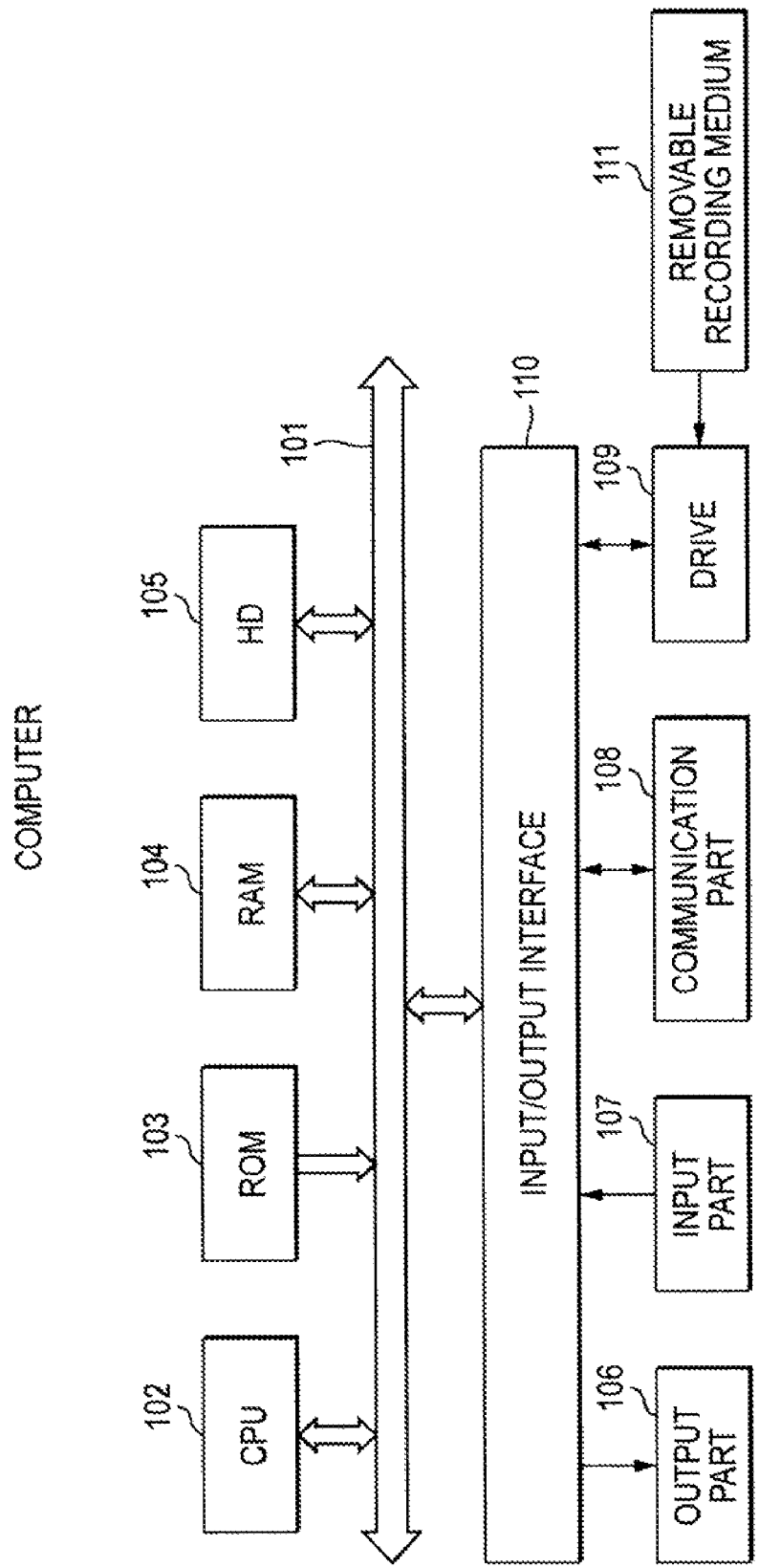

IMAGE PROCESSING APPARATUS, IMAGE PROCESSING METHOD, AND PROGRAM

CROSS REFERENCES TO RELATED APPLICATIONS

The present invention contains subject matter related to Japanese Patent Application JP 2006-305751 filed in the Japanese Patent Office on Nov. 10, 2006, the entire contents of which being incorporated herein by reference.

BACKGROUND OF THE INVENTION

1. Field of the Invention

The present invention relates to an image processing apparatus, an image processing method, and a program, particularly to an image processing apparatus, an image processing method, and a program, which can properly subject movie films to telecine conversion according to a reproduction form.

2. Description of the Related Art

For example, a movie screened in a theater is continuous video signals of 24 frames per second taken on a film. In the case in which the movie is broadcast as a television broadcast program or sold as a video package, it is necessary to subject the movie to telecine conversion for electric signals for television broadcasting as video signals of 30 frames (60 fields) per second.

For a method of telecine conversion, a technique called 3-2 pulldown (or 2-3 pulldown) is widely used.

For example, 3-2 pulldown is a technique in which frames, so-called progressive pictures sampled at the same time instant, configure video signals of a film that is a material subjected to 3-2 pulldown (hereinafter, properly referred to as a 3-2 pulldown material), two fields are formed from each of odd-numbered pictures and three fields are formed from each of even-numbered frames, whereby the rate is converted from 24 pictures per second to 60 fields per second (see Patent Reference 1 (JP-A-2003-189260)).

In other words, as shown in FIG. 1, from odd-numbered pictures P1 and P3, two fields of a top field and a bottom field configuring the picture are formed (that is, fields F1-1 and F1-2, and fields F3-1 and F3-2), and from even-numbered pictures P2 and P4, three fields of a top field, a bottom field and a top field, or a top field, a bottom field and a bottom field configuring the picture are formed (that is, fields F2-1, F2-2 and F2-3, and fields F4-1, F4-2 and F4-3). More specifically, the rate is converted so that a field the same as that two fields before is repeated every five fields.

SUMMARY OF THE INVENTION

However, as shown in FIG. 1, for the video signals in which the rate is thus converted by 3-2 pulldown, fields at the same time instant are interleaved with each other to form and reproduce frame images.

In the example shown in FIG. 1, the field F1-1 (Top) and the field F1-2 (Btm) are interleaved with each other to form two frames Q1 of substantially the same image, the field F2-1 (Top) and the field F2-2 (Btm) or the field F2-3 (Top) and the field F2-2 (Btm) are interleaved with each other to form three frames Q2 of substantially the same image, the field F3-2 (Top) and the field F3-1 (Btm) are interleaved with each other to form two frames Q3 of substantially the same image, and the field F4-2 (Top) and the field F4-1 (Btm) or the field F4-2 (Top) and the field F4-3 (Btm) are interleaved with each other to form three frames Q4 of substantially the same image.

More specifically, in the example shown in FIG. 1, the frames Q1, Q1, Q2, Q2, Q2, Q3, Q3, Q4, Q4, and Q4 are in turn reproduced.

However, in the case in which the frames are outputted that are obtained from the individual fields subjected to 3-2 pulldown, for example, in performing slow reproduction, the reproduction speed does not become constant in the slow reproduction of the individual frames Q even though reproduction speed is slowed down in the case of the example shown in FIG. 1, because two of the same frames and three of the same frames are alternately reproduced as two frames Q1 and three frames Q2 as indicated by double-headed arrows shown in FIG. 2.

Moreover, since a field the same as the field two fields before is repeated every five fields, it is necessary to generate a field two fields before by copying it. Therefore, there is a problem that synchronization control becomes complicated for making the display speed constant including the replicated fields.

In addition, the fields obtained through 3-2 pulldown as shown in part A in FIG. 3 each have predetermined flags as shown in part B in FIG. 3. These flags are used to select fields to interleave, but there is no flag to distinguish between pictures. Therefore, it is difficult to perform such control that different pictures are reproduced in frame advance and frame rewind reproductions.

For example, as shown by bottom arrows in FIG. 4, in the case of frame advance reproduction frame by frame, when a single frame is advanced from the second frame Q1, the first frame Q2 is reproduced, and thus a display image is changed. However, when a single frame is advanced from the first frame Q1, the second frame Q1 is reproduced, and an actual display image is not changed.

In addition, the progressive frame flag PFr in part B in FIG. 3 is a flag that is turned on ("1") when the field image signals configuring the frames at the same time instant are matched with each other, and turned off ("0") otherwise.

The repeat first field flag RFF is a flag that is turned on ("1") in the frame including a repeat field, and turned off ("0") in the other portions.

It is desirable to provide an image processing apparatus, an image processing method, and a program, which can properly perform telecine conversion so as to conduct suitable image reproduction even in special reproductions such as slow reproduction and frame advance reproduction.

An image processing apparatus according to an embodiment of the invention is an image processing apparatus including: a field forming means for subjecting 3-2 pulldown materials to 3-2 pulldown to form field images in normal reproduction, and for adding flag information to the individual formed field images, the flag information being necessary to generate frame images from field images based on the flag information added to the 3-2 pulldown materials; and a generating means for generating frame images from the field images formed by the field forming means based on the flag information added to the field images, wherein in a special reproduction other than the normal reproduction, according to its reproduction form, the field forming means forms a predetermined field image from the 3-2 pulldown material, and adds flag information to the individual formed field images, the flag information that has to be added to a field image possibly formed by subjecting the 3-2 pulldown material corresponding to the field image to 3-2 pulldown, and the generating means generates a frame image from the field image based on the flag information added to the field image.

The generating means may determine whether the field image is formed from the 3-2 pulldown material based on the flag information added to the field image formed by the field forming means, and when the means determines that the field image is formed from the material through 3-2 pulldown, it may generate a frame image from the field image based on the flag information added to the field image.

In the case of slow reproduction, slow reverse reproduction, frame advance reproduction, or frame rewind reproduction, the field forming means may form two field images from each of progressive pictures.

In the case of N× speed, the field forming means may generate a field image from the 3-2 pulldown material so that a ratio to the number of field images formed from the 3-2 pulldown materials is N in accordance with the number of field images that can be formed through 3-2 pulldown and N×reproduction.

An image processing method according to an embodiment of the invention is an image processing method including the steps of: subjecting 3-2 pulldown materials to 3-2 pulldown to form field images in normal reproduction, and adding flag information to the individual formed field images, the flag information being necessary to generate frame images from field images based on the flag information added to the 3-2 pulldown materials; and generating frame images from the field images formed in the process of the field forming step based on the flag information added to the field images, wherein in a special reproduction other than the normal reproduction, according to its reproduction form, in the field forming step, a predetermined field image is formed from the 3-2 pulldown material, and flag information is added to the individual formed field images, the flag information that has to be added to a field image possibly formed by subjecting the 3-2 pulldown material corresponding to the field image to 3-2 pulldown, and in the generating step, a frame image is generated from the field image based on the flag information added to the field image.

A program according to an embodiment of the invention is a program which allows a computer to execute an image process including the steps of: subjecting 3-2 pulldown materials to 3-2 pulldown to form field images in normal reproduction, and adding flag information to the individual formed field images, the flag information being necessary to generate frame images from field images based on the flag information added to the 3-2 pulldown materials; and generating frame images from the field images formed in the process of the field forming step based on the flag information added to the field image, wherein in a special reproduction other than the normal reproduction, according to its reproduction form, in the field forming step, a predetermined field image is formed from the 3-2 pulldown material, and flag information is added to the individual formed field images, the flag information that has to be added to a field image possibly formed by subjecting the 3-2 pulldown material corresponding to the field image to 3-2 pulldown, and in the generating step, a frame image is generated from the field image based on the flag information added to the field image.

In an image processing apparatus, the image processing method, or the program according to an embodiment of the invention, 3-2 pulldown materials are subjected to 3-2 pulldown to form field images in normal reproduction, and flag information is added to the individual formed field images, the flag information being necessary to generate frame images from field images based on the flag information added to the 3-2 pulldown materials; and in the case in which frame images are generated from the field images formed in the process of the field forming step based on the flag information added to the field image, wherein in a special reproduction other than the normal reproduction, according to its reproduction form, a predetermined field image is formed from the 3-2 pulldown material, and flag information is added to the individual formed field images, the flag information that has to be added to a field image possibly formed by subjecting the 3-2 pulldown material corresponding to the field image to 3-2 pulldown, and a frame image is generated from the field image based on the flag information added to the field image.

According to an embodiment of the invention, suitable image reproduction can be performed even in special reproductions such as slow reproduction and frame advance for 3-2 pulldown materials.

BRIEF DESCRIPTION OF THE DRAWINGS

FIG. 14 shows a block diagram depicting an exemplary configuration of a computer to which an embodiment of the invention is adapted.

DETAILED DESCRIPTION OF THE INVENTION

Hereinafter, an embodiment of the invention will be described. The following is examples of the correspondence between configuration requirements for the invention and the embodiments of the specification or the drawings. This is described for confirming that the embodiments supporting the invention are described in the specification or the drawings. Therefore, even though there is an embodiment that is described in the specification or the drawings but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

An image processing apparatus according to an embodiment of the invention is an image processing apparatus including: a field forming means (for example, a display control part 11 shown in FIG. 5) for subjecting 3-2 pulldown materials to 3-2 pulldown to form field images in normal reproduction, and for adding flag information to the individual formed field images, the flag information being necessary to generate frame images from field images based on the flag information added to the 3-2 pulldown materials; and a generating means (for example, a frame generating part 13 shown in FIG. 5) for generating frame images from the field images formed by the field forming means based on the flag information added to the field images, wherein in a special reproduction other than the normal reproduction, according to its reproduction form, the field forming means forms a predetermined field image from the 3-2 pulldown materials, and adds flag information to the individual formed field images, the flag information that has to be added to a field image possibly formed by subjecting the 3-2 pulldown material corresponding to the field image to 3-2 pulldown, and the generating means generates a frame image from the field image based on the flag information added to the field image.

Figure 1:
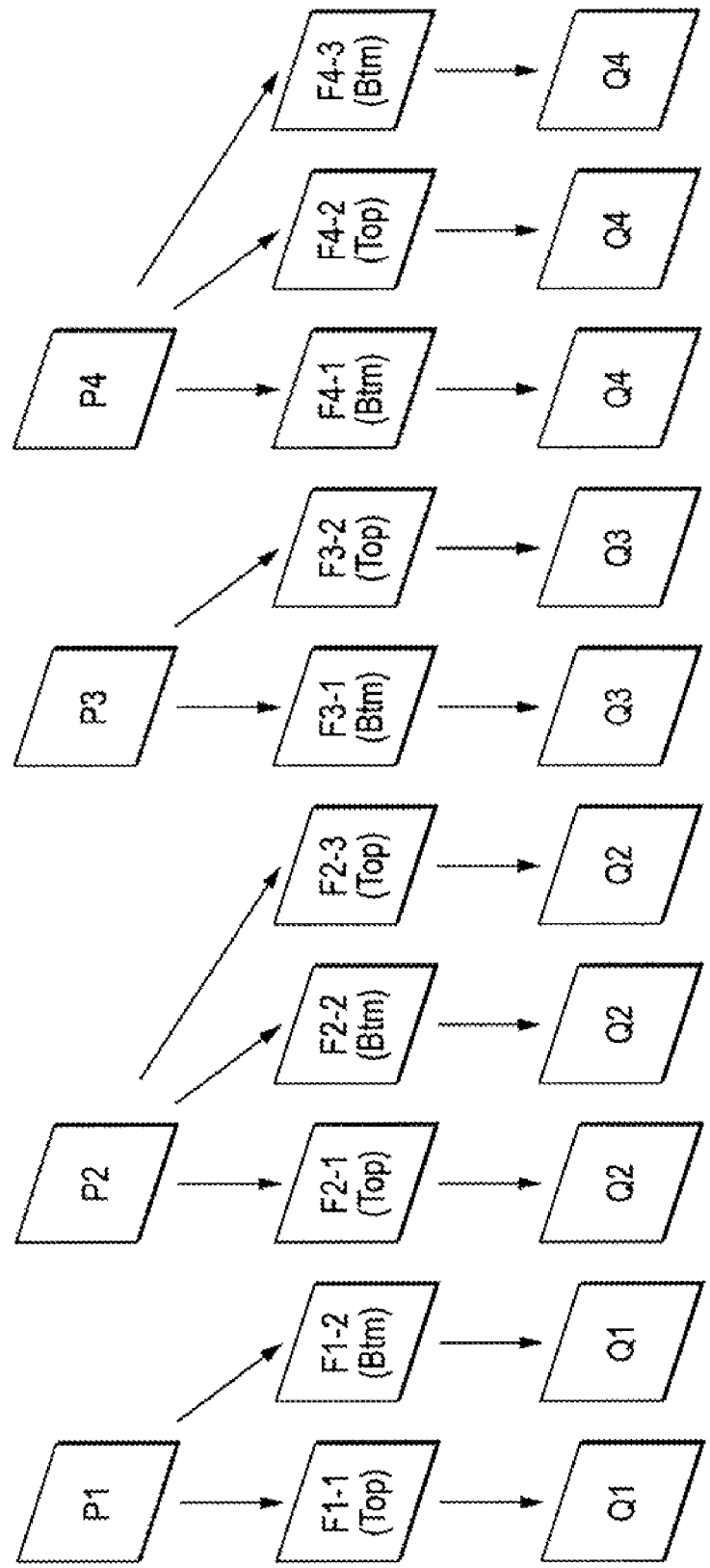
FIG. 1 shows a diagram illustrative of 3-2 pulldown.
Figure 2:
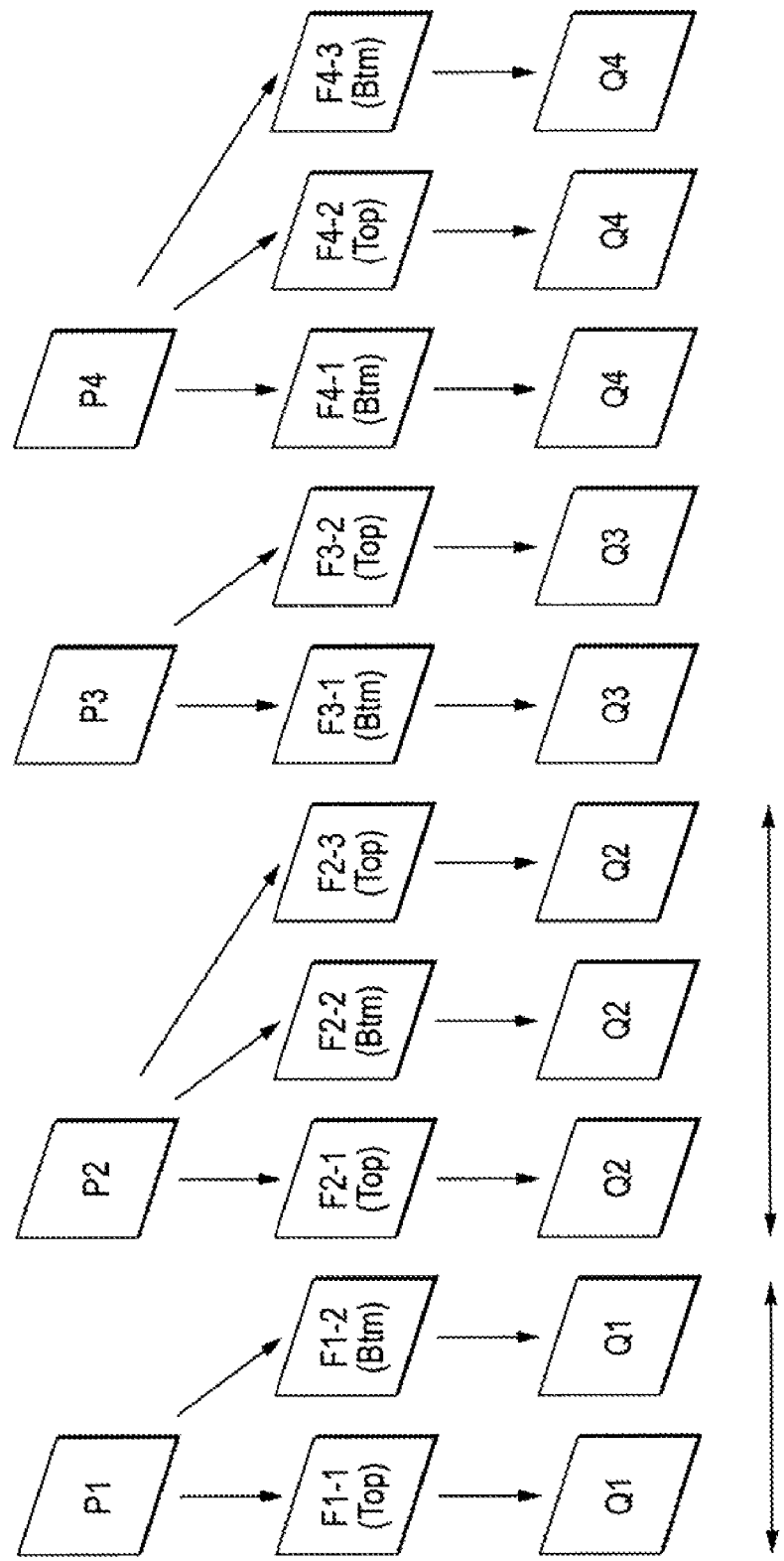
FIG. 2 shows a diagram illustrative of slow reproduction in 3-2 pulldown.
Figure 3:
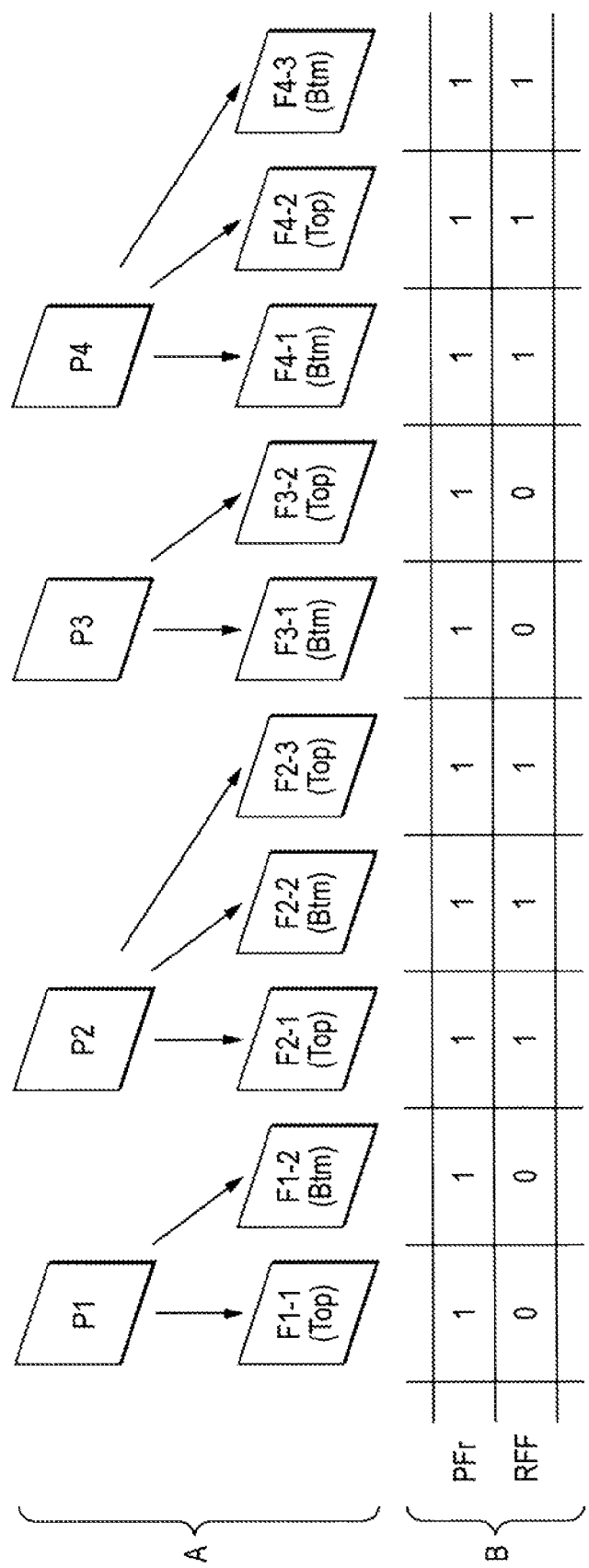
FIG. 3 shows a diagram illustrative of flags added to fields formed according to 3-2 pulldown.
Figure 4:
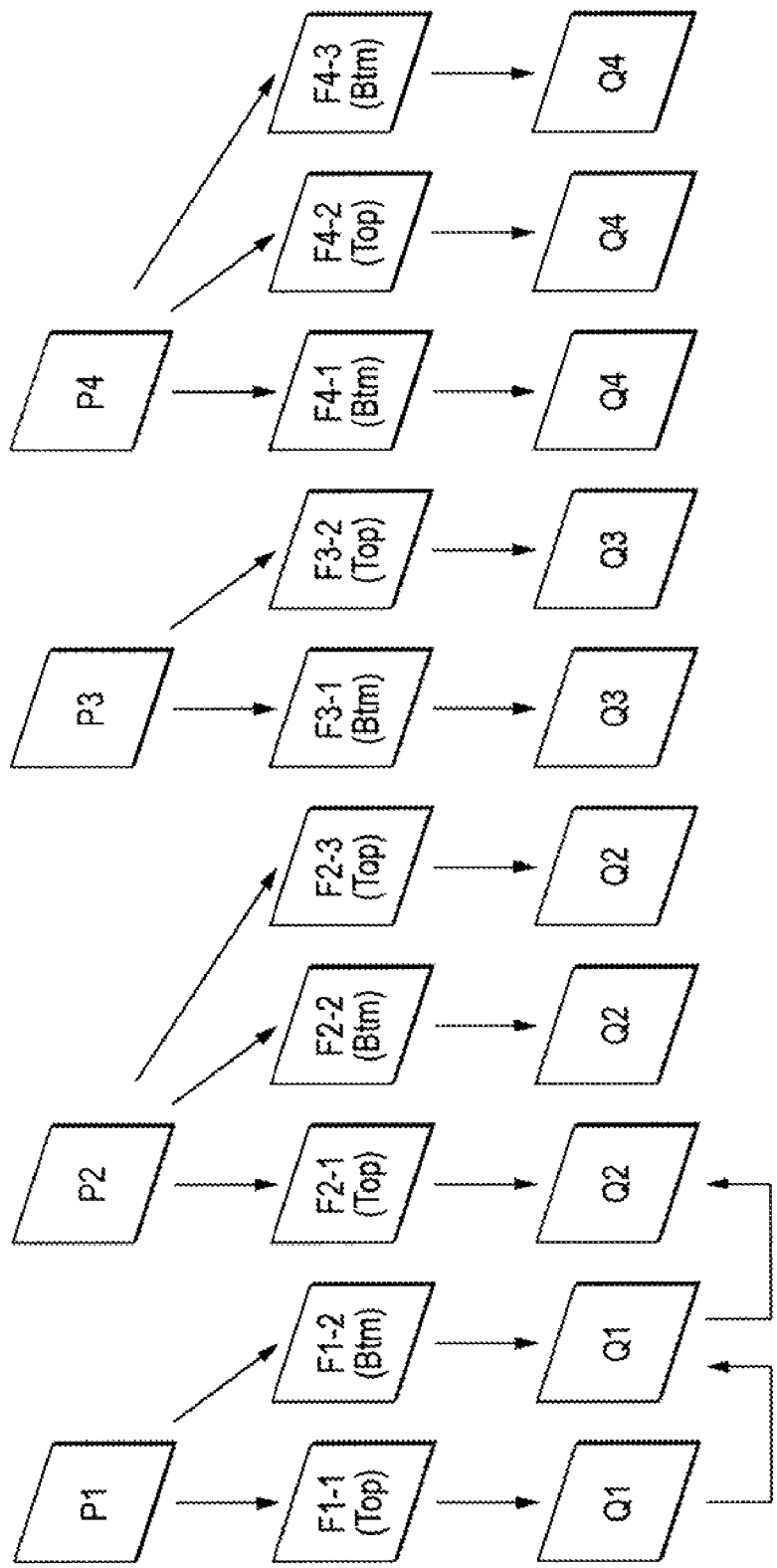
FIG. 4 shows a diagram illustrative of frame advance reproduction in 3-2 pulldown.
Figure 5:
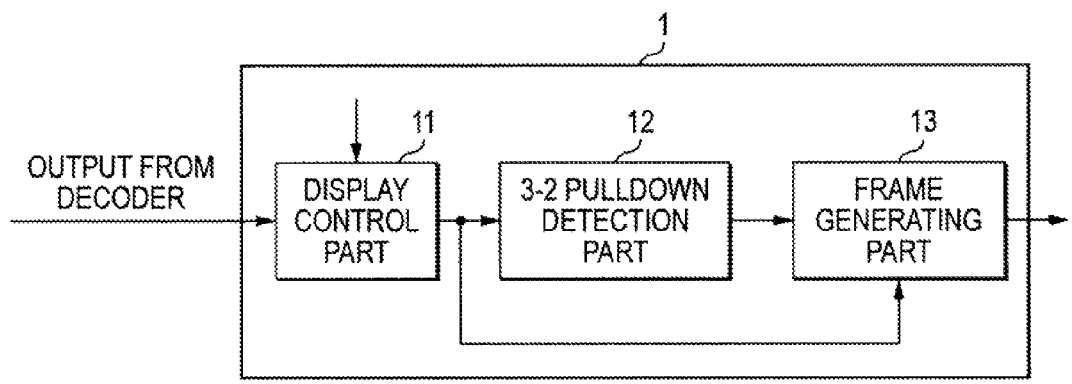
FIG. 5 shows a block diagram depicting an exemplary configuration of an image processing apparatus 1 to which an embodiment of the invention is adapted.

The generating means may determine whether the field image is formed from the 3-2 pulldown material based on the flag information added to the field image formed by the field forming means (for example, a 3-2 pulldown detecting part 12 shown in FIG. 5), and when the means determines that the field image is formed from the material through 3-2 pulldown, it may generate a frame image from the field image based on the flag information added to the field image (for example, the frame generating part 13 shown in FIG. 5).

In the case of slow reproduction, slow reverse reproduction (for example, FIG. 8 and FIG. 9), frame advance reproduction, or frame rewind reproduction (for example, FIG. 12), the field forming means may form two field images from each of progressive pictures.

Figure 10:
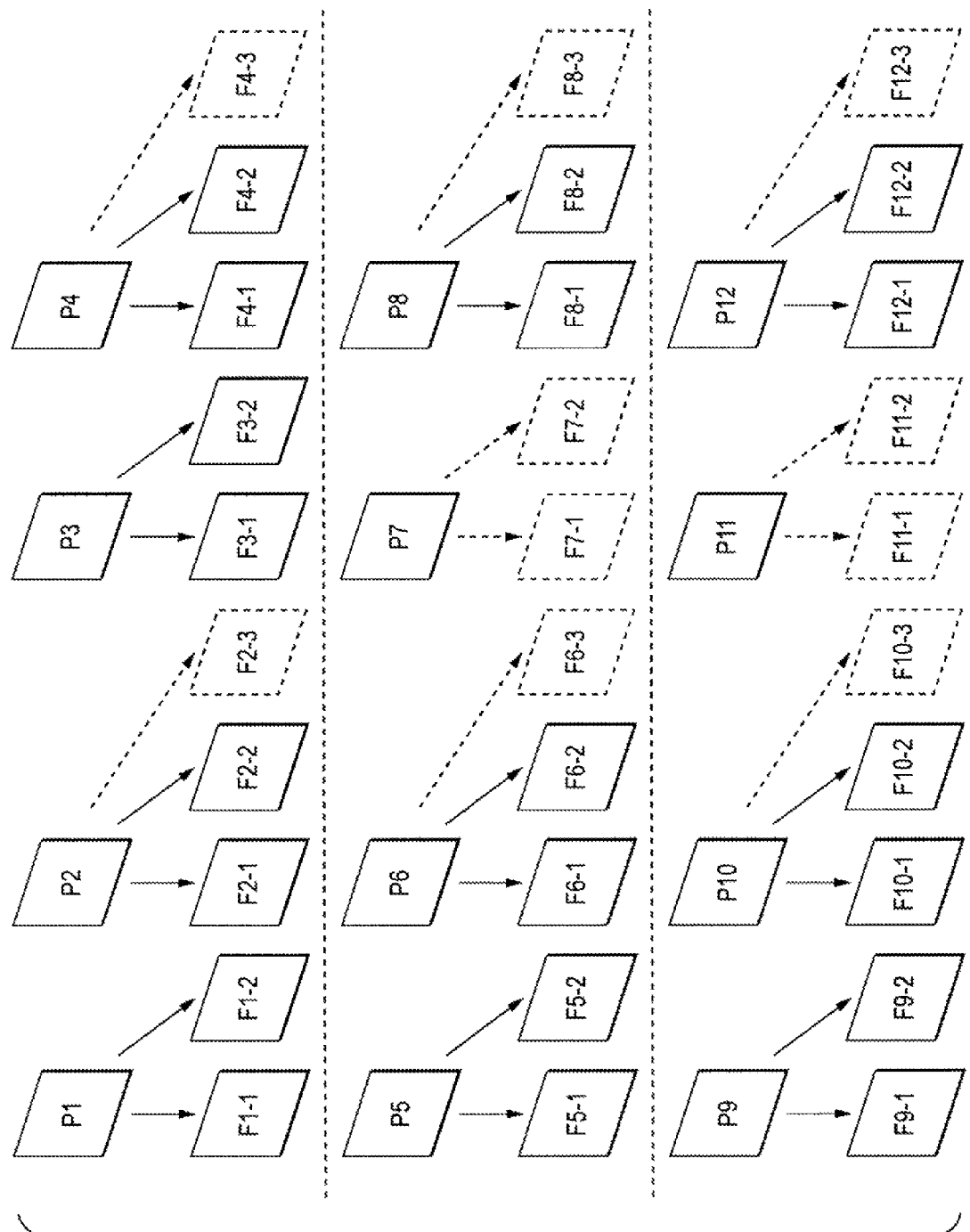
FIG. 10 shows a diagram illustrative of the operation of the image processing apparatus 1 shown in FIG. 5 in performing 1.5× reproduction.
Figure 11:
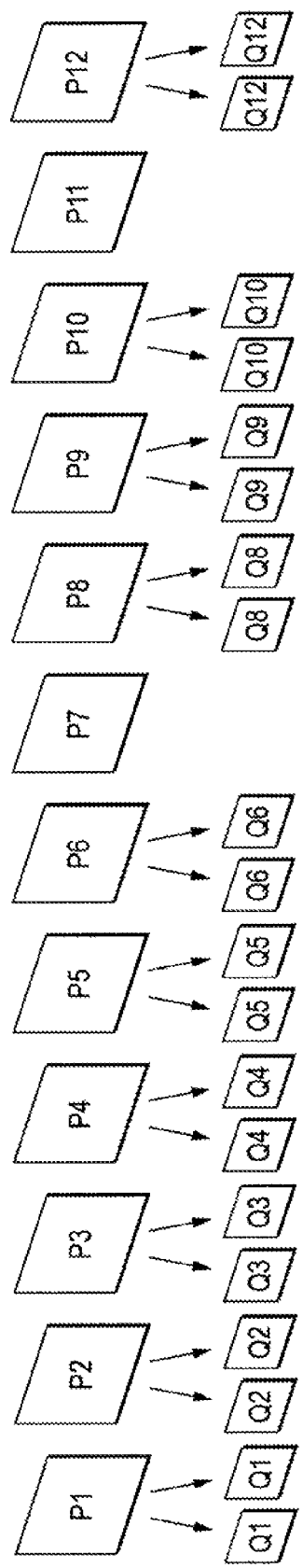
FIG. 11 shows another diagram illustrative of the operation of the image processing apparatus 1 shown in FIG. 5 in performing 1.5× reproduction.

In the case of N× speed, the field forming means may generate a field image from the 3-2 pulldown material so that a ratio to the number of field images formed from the 3-2 pulldown materials is N in accordance with the number of field images that can be formed through 3-2 pulldown and N×reproduction (for example, FIGS. 10 and 11).

Figure 13:
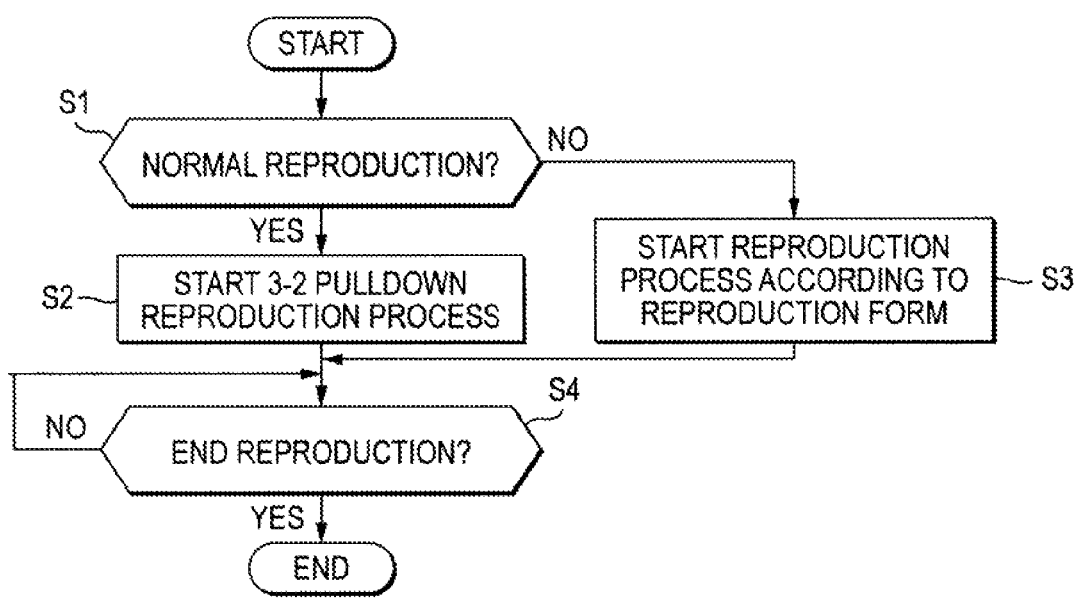
FIG. 13 shows a flow chart illustrative of a reproduction process done by the image processing apparatus shown in FIG. 5.

An image processing method or a program according to an embodiment of the invention is an image processing method, or a program including the steps of: subjecting 3-2 pulldown materials to 3-2 pulldown to form field images in normal reproduction, and adding flag information to the individual formed field images, the flag information being necessary to generate frame images from field images based on the flag information added to the 3-2 pulldown materials (for example, Step S2 shown in FIG. 13); and generating frame images from the field images formed in the process of the field forming step based on the flag information added to the field images (for example, Step S2 shown in FIG. 13), wherein in a special reproduction other than the normal reproduction, according to its reproduction form, in the field forming step, a predetermined field image is formed from the 3-2 pulldown material, and flag information is added to the individual formed field images, the flag information that has to be added to a field image possibly formed by subjecting the 3-2 pulldown material corresponding to the field image to 3-2 pulldown (for example, Step S3 shown in FIG. 13), and in the generating step, a frame image is generated from the field image based on the flag information added to the field image (for example, Step S3 shown in FIG. 13).

FIG. 5 shows an exemplary configuration of an image processing apparatus 1 to which an embodiment of the invention is adapted.

A display control part 11 receives continuous frames at 24 frames per second (progressive pictures) on a film configuring video of a movie screened in a theater, which are 3-2 pulldown materials.

Moreover, the display control part 11 also receives instructions from a manipulating part, not shown, in response to user manipulations to the manipulating part (for example, reproduction instructions according to the reproduction form such as normal reproduction, slow reproduction, and double speed reproduction).

Figure 6:
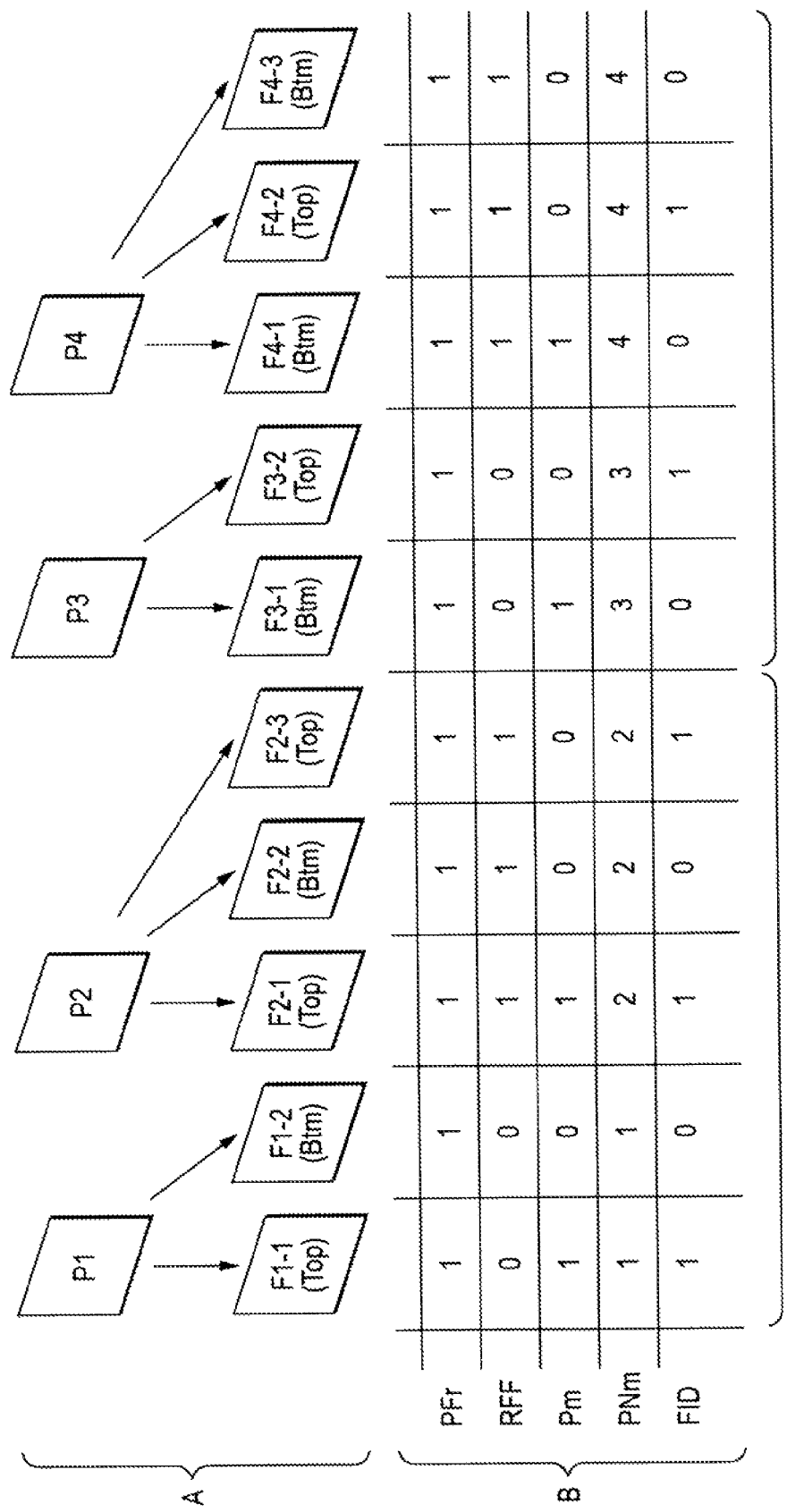
FIG. 6 shows a diagram illustrative of the operation of the image processing apparatus 1 shown in FIG. 5 in performing normal reproduction.

In the case in which the display control part 11 receives an instruction for normal reproduction, as shown in part A in FIG. 6, for example, the part 11 forms two fields from odd-numbered pictures in the drawing, and forms three fields from even-numbered picture to perform 3-2 pulldown.

When the display control part 11 forms fields from each of the pictures, the part 11 adds flags shown in part B in FIG. 6 to the formed field based on flag information added to a progressive picture.

The progressive frame flag PFr is a flag that distinguishes between the portion having the matched fields configuring the frames at the same time instant and the portion otherwise in the fields formed through 3-2 pulldown. As the example shown in part A in FIG. 6, in the case in which the fields configuring the frames at the same time instant are matched, the flag is 1 in all the fields as shown in part B in FIG. 6.

The repeat first field flag RFF is a flag that is 1 for the pictures including repeat fields in performing 3-2 pulldown. In the example shown in FIG. 6, the flag is 1 in fields F2-1, F2-2 and F2-3 formed from a picture P2 and fields F4-1, F4-2 and F4-3 formed from a picture P4.

In addition, the progressive frame flag PFr and the repeat first field flag RFF are added to progressive pictures as flag information.

The picture renewal flag Pm is turned to 1 when a picture is updated, and the fields formed from the same picture are turned to 0. In the example shown in FIG. 6, the field F1-1, the field F2-1, the field F3-1, and the field F4-1, which are the first field in each of the pictures, are turned to 1, and the fields other than these are turned to 0.

A picture number PNm is a unique value for every picture, and the fields generated from the same picture have the same picture number. In addition, the number is unnecessarily continuous numbers, but it is necessary that the fields do not have the same picture number among different pictures for all the pictures referenced in distinguishing between pictures.

A field ID (FID) is a flag that indicates whether a field outputted from the display control part 11 is a top field or a bottom field. It is necessary to assign 0 and 1 between the top field and the bottom field, which do not have to overlap with each other. For example, suppose the output of the Top field is 1 and the output of the Bottom field is 0, the outputs are as shown in FIG. 6.

In the case in which the display control part 11 receives a reproduction instruction for reproduction other than normal reproduction is inputted (that is, special reproduction), the part 11 changes fields to be formed from pictures in accordance with the special reproduction. This process will be described later.

Returning to FIG. 5, the display control part 11 supplies the formed fields to a 3-2 pulldown detecting part 12.

The 3-2 pulldown detecting part 12 references to the flags added to the fields supplied from the display control part 11, determines whether the fields are formed from the 3-2 pulldown materials, and notifies a frame generating part 13 about the determined result.

In other words, since the individual fields formed by subjecting 3-2 pulldown materials to 3-2 pulldown have flags shown in part B in FIG. 6, the flags (PFr, RFF, Pm) repeatedly have (1, 0, 1), (1, 0, 0), (1, 1, 1), (1, 1, 0), and (1, 1, 0). Thus, these three flags are referenced to determine whether the fields are formed from the 3-2 pulldown materials.

In addition, since the flags (PFr, RFF) even have certain regularities, the flags (PFr, RFF) are referenced to determine whether the fields are formed from the 3-2 pulldown materials.

Again returning to FIG. 5, when the frame generating part 13 receives a notice from the 3-2 pulldown detecting part 12 that the fields outputted from the display control part 11 are formed from the 3-2 pulldown materials, the frame generating part 13 references to the flags added to the fields supplied from the display control part 11 to select the fields to interleave, and interleaves the selected fields to generate frames. More specifically, the notice that the fields outputted from the display control part 11 are formed from the 3-2 pulldown materials means that frames can be generated from the fields supplied from the display control part 11 by using the flags added to the fields.

Figure 7:
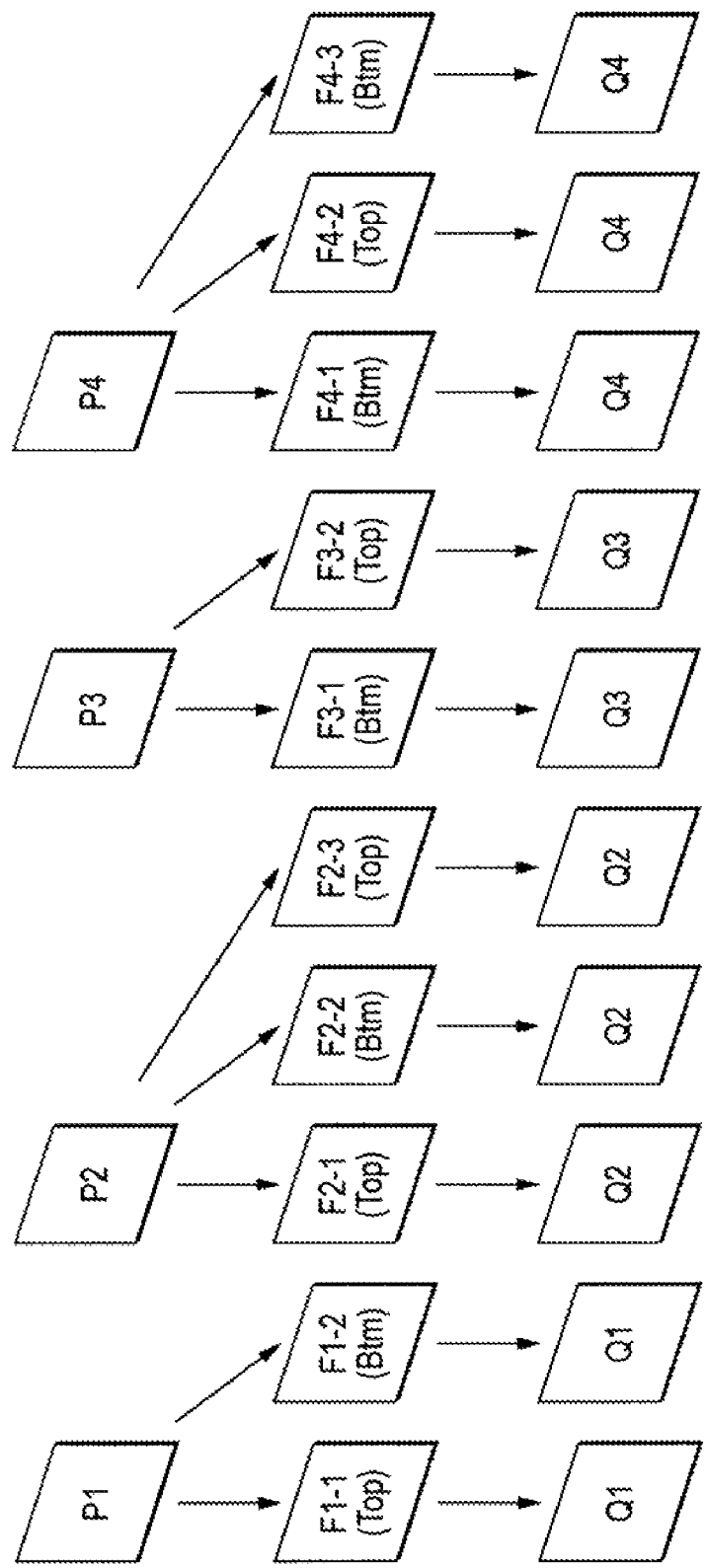
FIG. 7 shows another diagram illustrative of the operation of the image processing apparatus 1 shown in FIG. 5 in performing normal reproduction.

For example, in the example shown in FIG. 6, in the case in which the field F1-1 and the field F1-2 are supplied from the display control part 11, as the field to interleave with the field F-1, the field F1-2 is selected that has the same picture number PNm (1) as the field F1-1 has, and the first frame Q1 is generated as shown in FIG. 7. Similarly, as the field to interleave with the field F1-2, the field F1-1 is selected that has the same picture number PNm (1) as the field F1-2 has, and the second frame Q1 is generated as shown in FIG. 7.

In addition, since the frame generating part 13 references to the picture number PNm and the flag FID to recognize whether the individual fields are the top field or the bottom field of the picture, the phases can be determined accurately.

In addition, the 3-2 pulldown detecting part 12 references to the flags added to the fields supplied from the display control part 11, and determines whether the fields are formed from the 3-2 pulldown materials. However, it is sometimes difficult to properly determine whether the fields are formed from the 3-2 pulldown materials because the flags are not sometimes added properly in the display control part 11.

Even though the frame generating part 13 receives a notice from the 3-2 pulldown detecting part 12 that the fields are not formed through 3-2 pulldown, the frame generating part 13 can determine whether the fields are formed from the 3-2 pulldown materials and can detect the fields to interleave based on the characteristics (regularity) of the fields formed through 3-2 pulldown. In addition, the detail of the process is described in the Patent Reference 1 in detail.

Next, the operations of the individual parts will be described in the case in which a reproduction instruction of slow reproduction is made.

In the case of normal reproduction, as shown in FIG. 7, the display control part 11 forms a field (repeat field) that is a field the same as that two fields before every five fields. In the case of slow reproduction, the formation of the repeat field is stopped (that is, 3-2 pulldown is not performed), and two fields are generated from each of the pictures.

Figure 8:
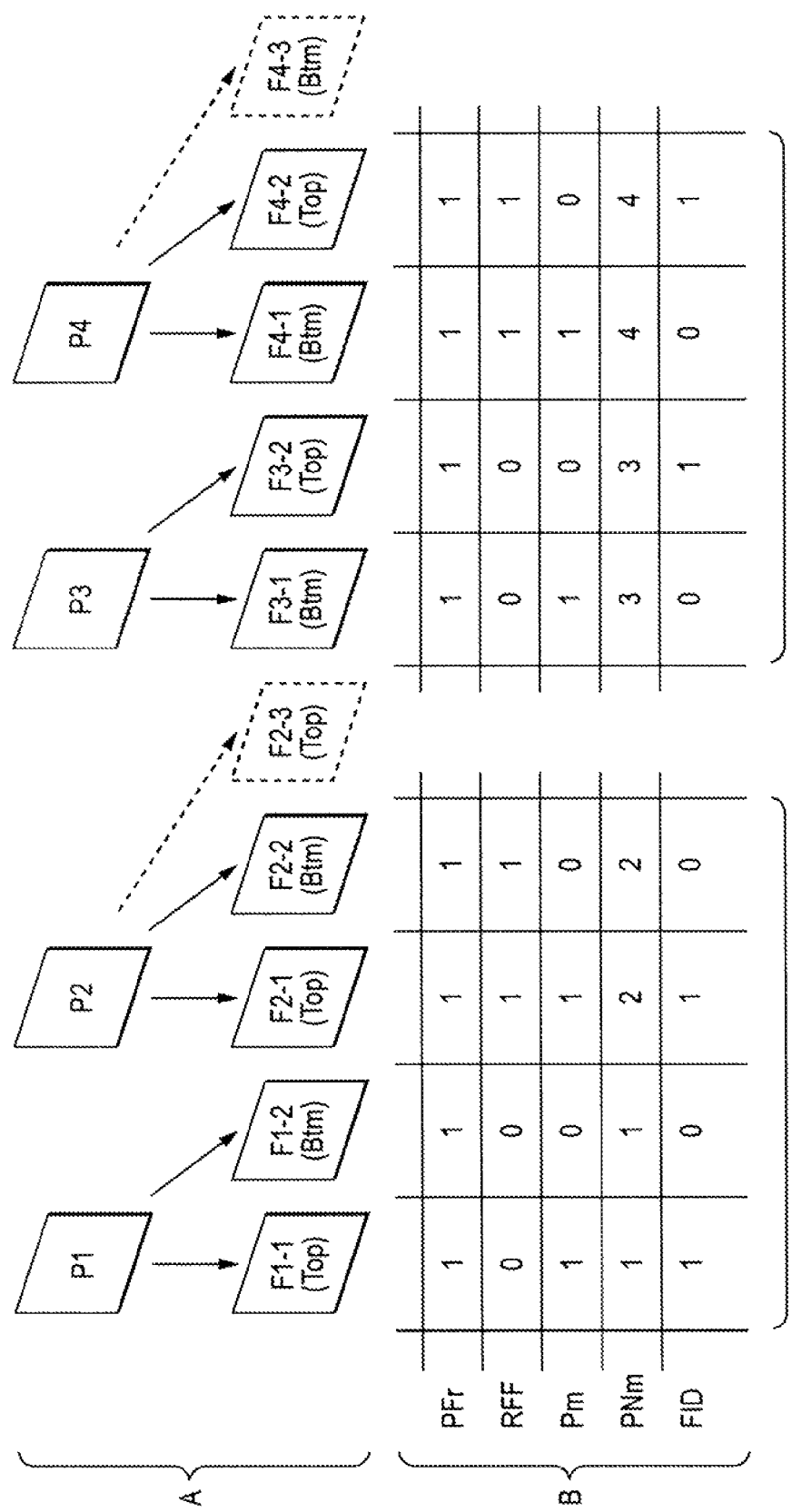
FIG. 8 shows diagram illustrative of the operation of the image processing apparatus 1 shown in FIG. 5 in performing slow reproduction.

More specifically, as shown in FIG. 8, the fifth field F2-3 and the tenth field F4-3 from the left depicted by a broken line in the drawing are not formed, which are formed in normal reproduction, and two fields F are formed from each of the pictures P.

In this case, the individual fields supplied from the display control part 11 are added with flags as shown in part B in FIG. 8, and (1, 0, 1), (1, 0, 0), (1, 1, 1), and (1, 1, 0) are repeatedly assigned to the flags (PFr, RFF, Pm). Thus, the 3-2 pulldown detecting part 12 references to these three flags to determine whether the fields supplied from the display control part 11 are formed from the 3-2 pulldown materials.

In addition, since the flags (PFr, RFF) even have certain regularities, the flags (PFr, RFF) are referenced to determine whether the fields are formed from the 3-2 pulldown materials.

As similar to normal reproduction, the frame generating part 13 basically detects the picture number PNm added to the fields supplied from the display control part 11, selects the fields to interleave based on the picture number PNm, and interleaves the fields.

Figure 9:
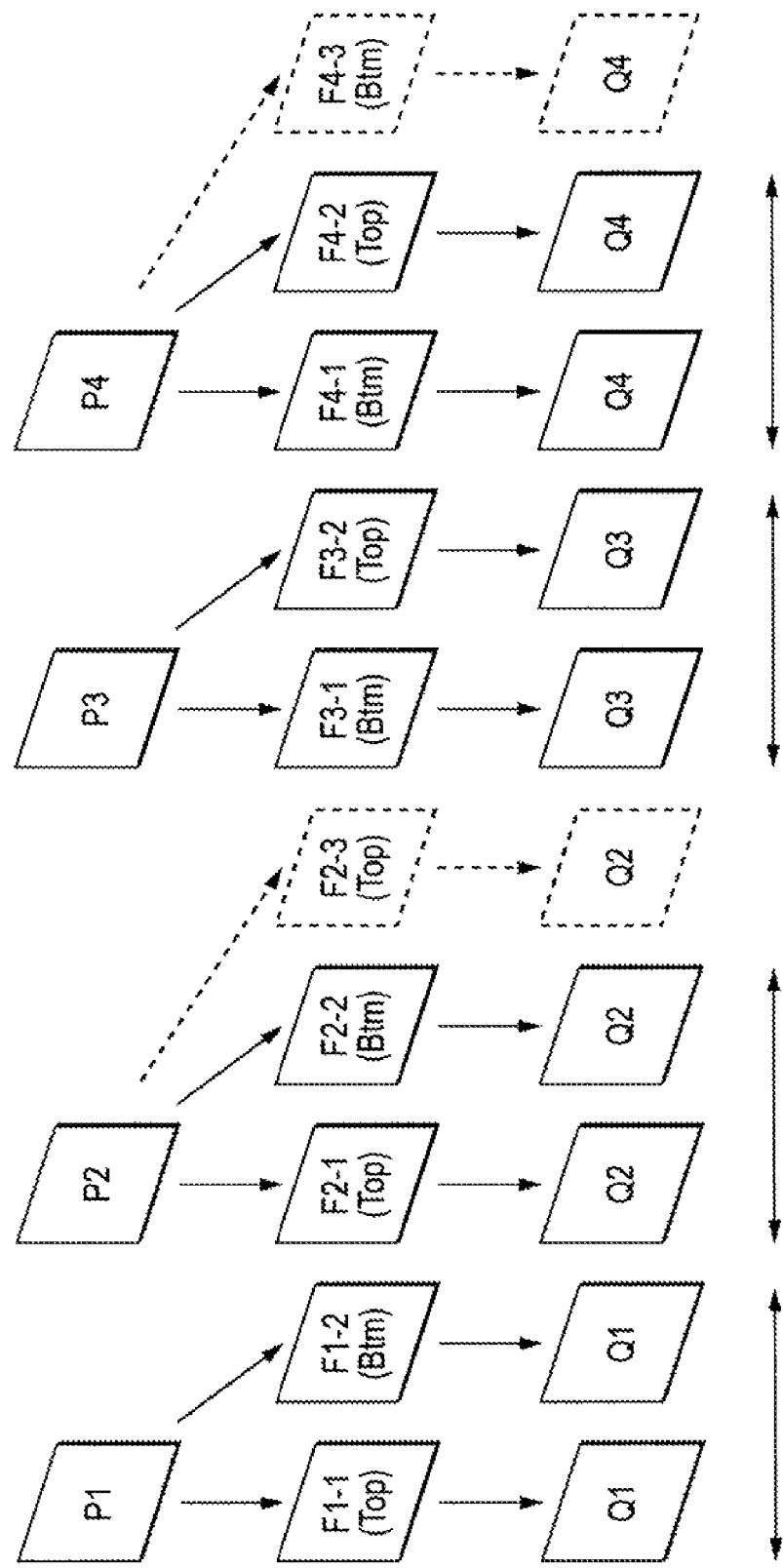
FIG. 9 shows another diagram illustrative of the operation of the image processing apparatus 1 shown in FIG. 5 in performing slow reproduction.

More specifically, in this case, as shown in FIG. 9, the frames Q1, Q2, Q3, and Q4 are formed two each. Thus, in slow reproduction, images of the individual frames Q are regularly displayed, and the slow reproduction speed becomes constant.

In addition, here, slow reproduction is taken and described as an example, and slow reverse reproduction is also basically similarly performed.

Next, the operations of the individual parts will be described in the case in which a reproduction instruction is made for 1.5× speed reproduction.

In this case, as shown in FIG. 10, the display control part 11 generates two fields from each of pictures without performing 3-2 pulldown, as similar to the case of slow reproduction. However, for example, 12 continuous pictures make a single set, and field formation is skipped in the seventh picture (picture P7 in the example shown in FIG. 10) and in the eleventh picture (picture P11 in the example shown in FIG. 10). More specifically, in FIG. 10, the fields depicted by a broken line are not formed, which are generated in normal reproduction.

Not shown in the drawing, since the individual fields supplied from the display control part 11 have the flags (PFr, RFF, Pm) in accordance with certain rules, the 3-2 pulldown detecting part 12 references to these three flags to determine whether the fields supplied from the display control part 11 are formed from the 3-2 pulldown materials.

In addition, since the flags (PFr, RFF) even have certain regularities, the flags (PFr, RFF) are referenced to determine whether the fields are formed from the 3-2 pulldown materials.

As similar to normal reproduction, the frame generating part 13 basically detects the picture number PNm added to the fields supplied from the display control part 11, selects the fields to interleave based on the picture number PNm, and interleaves the fields.

More specifically, in this case, as shown in FIG. 11, since 20 frames Q are generated and reproduced from 12 pictures P1 to P12, fields are reproduced at 1.5× speed to the case in which 30 frames are originally reproduced.

In addition, here, 1.5× reproduction is taken and described as an example, but reproduction is also basically similarly performed at different speeds.

More specifically, in the case of N× speed, fields are generated from the 3-2 pulldown materials so that the ratio to a predetermined number of fields formed from the 3-2 pulldown materials becomes N in accordance with the number of fields that can be generated through 3-2 pulldown and N× reproduction, whereby N× speed reproduction can be implemented.

Next, the operations of the individual parts will be described in the case in which a reproduction instruction of frame advance reproduction is inputted.

In this case, as similar to the case of slow reproduction shown in FIG. 8, the display control part 11 forms two fields from each of the pictures, without performing 3-2 pulldown.

As similar to the case of slow reproduction, the 3-2 pulldown detecting part 12 references to the flags (PFr, RFF, Pm) to determine whether the fields supplied from the display control part 11 are formed from the 3-2 pulldown materials.

Figure 12:
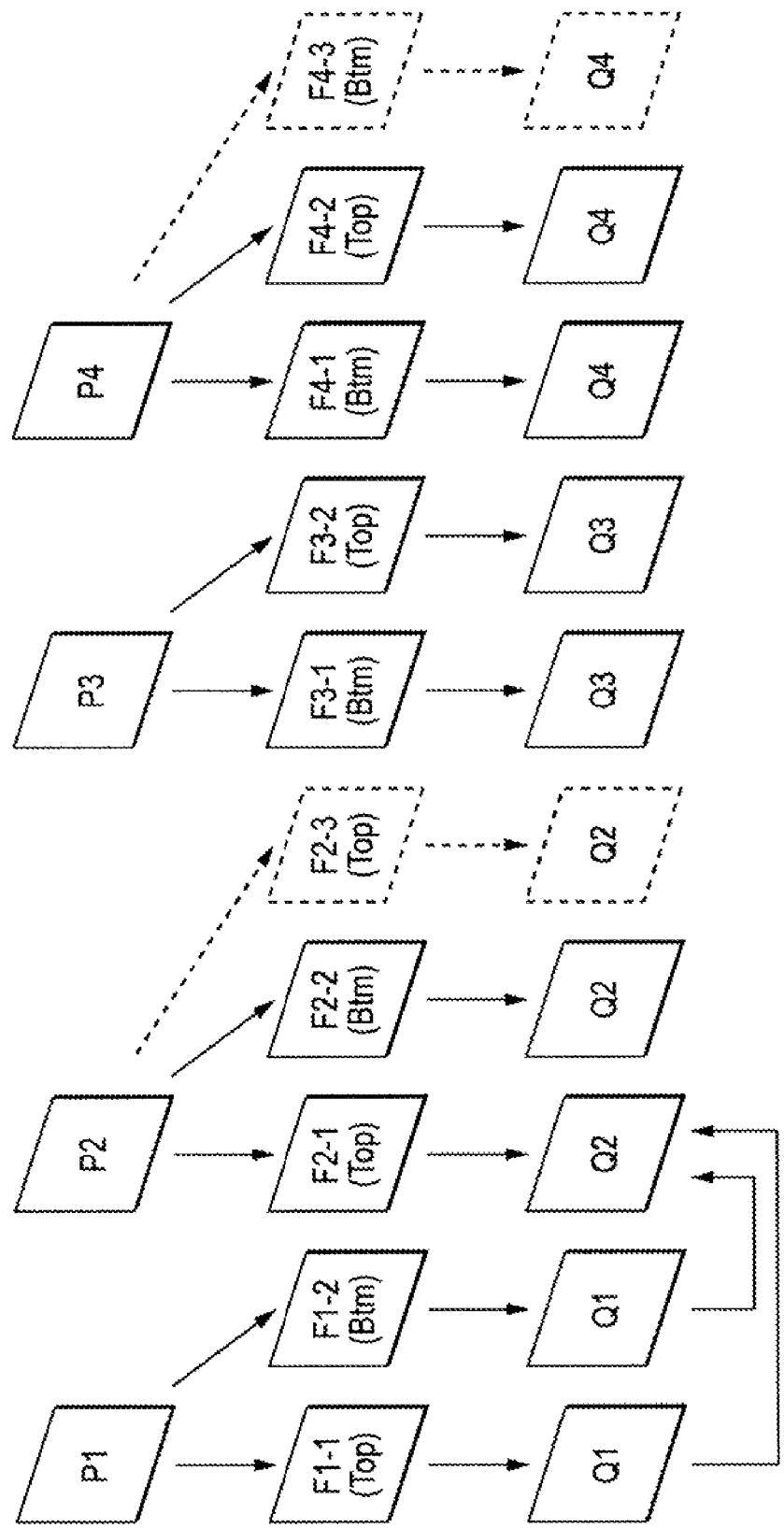
FIG. 12 shows a diagram illustrative of the operation of the image processing apparatus 1 shown in FIG. 5 in performing frame advance reproduction.

For example, as shown in FIG. 12, in the case in which the reproduction of a single frame advance is performed from the first frame Q1, the frame generating part 13 uses the field F2-1 to generate the frame Q2 (that is, the field F2-1 and the field F2-2 are interleaved with each other to generate the frame Q2) for reproduction, the field F2-1 that is a field configuring the frames after the first frame Q1 and having the picture renewal flag Pm of 1.

In addition, for example, as shown in FIG. 12, similarly, in the case in which the reproduction of a single frame advance is performed from the second frame Q1, the frame generating part 13 uses the field F2-1 to generate the frame Q2 (that is, the field F2-1 and the field F2-2 are interleaved with each other to generate the frame Q2) for reproduction, the field F2-1 that is a field configuring the frames after the second frame Q1 and having the picture renewal flag Pm of 1.

As described above, since such frames are reproduced that are different from the frame instructed for frame advance reproduction, reproduction can be controlled so that different pictures are advanced frame by frame.

In addition, here, frame advance reproduction is taken and described as an example, but frame rewind reproduction is also similarly performed.

Next, the reproduction operation of the image processing apparatus 1 will be summarized with reference to a flow chart shown in FIG. 13.

A reproduction instruction is inputted to the display control part 11, and then in Step S1, the display control part 11 determines whether the instruction is the instruction for normal reproduction. If the part 11 determines that the instruction is the instruction for normal reproduction, the process goes to Step S2.

In Step S2, as shown in FIG. 6, the display control part 11 performs 3-2 pulldown to generate predetermined fields from each of the pictures. The 3-2 pulldown detecting part 12 references to the flags added to the fields supplied from the display control part 11, determines whether the fields are formed from the 3-2 pulldown materials, and notifies the frame generating part 13 about the determined result.

If the frame generating part 13 receives a notice from the 3-2 pulldown detecting part 12 that the fields outputted from the display control part 11 are formed from the 3-2 pulldown materials, the part 13 references to the flags added to the fields supplied from the display control part 11 to select the fields to interleave, and interleaves the selected fields to generate frames, as shown in FIG. 7.

In Step S1, if it is determined that the instruction is not the instruction for normal reproduction, the process goes to Step S3, and the display control part 11, the 3-2 pulldown detecting part 12 and the frame generating part 13 perform the process according to the reproduction form.

More specifically, for example, in the case in which the instructed reproduction is slow reproduction, the process described with reference to FIG. 8 and FIG. 9 is performed in the display control part 11, the 3-2 pulldown detecting part 12 and the frame generating part 13.

In the case of 1.5× reproduction, the process described with reference to FIGS. 10 and 11 is performed in the display control part 11, the 3-2 pulldown detecting part 12 and the frame generating part 13.

In the case of frame advance reproduction, the process described with reference to FIG. 12 is performed in the display control part 11, the 3-2 pulldown detecting part 12 and the frame generating part 13.

When 3-2 pulldown reproduction is started in Step S2, or the process according to the reproduction form is started in Step S3, in Step S4, the part 11 waits until the instruction of finishing reproduction is inputted (that is, the reproduction process is continued). When the instruction of finishing reproduction is inputted, the running reproduction process is ended.

Next, a series of the process steps described above may be performed by hardware or may be by software. In the case in which a series of the process steps is performed by software, a program configuring the software is installed in a multipurpose computer, or the like.

FIG. 14 shows an exemplary configuration of an embodiment of a computer in which a program to run a series of the process steps is installed.

The program can be recorded in advance in a hard disk 105 or a ROM 103 as a recording medium built in the computer.

Alternatively, the program can be temporarily or permanently stored (recorded) on a removable recording medium 111 such as a flexible disc, a CD-ROM (Compact Disc Read Only Memory), an MO (Magneto-optical) disc, a DVD (Digital Versatile Disc), a magnetic disc, and a semiconductor memory. The removable recording medium 111 like this can be provided as so-called package software.

Moreover, the program is installed into the computer through the removable recording medium 111 as described above, as well as it can be installed into the hard disk 105 incorporated in the computer from a download site through an artificial satellite for digital satellite broadcast over radio transmission, or installed into the computer through a network such as a LAN (Local Area Network) and the Internet over cable transmission, or installed into the incorporated hard disk 105 by receiving the program thus transmitted by a communicating part 108 in the computer.

The computer has a CPU (Central Processing Unit) 102 therein. To the CPU 102, an I/O interface 110 is connected through a bus 101. When a user manipulates an input part 107 configured of a keyboard, a mouse, a microphone, etc., to enter an instruction to the CPU 102 through the I/O interface 110, it runs the program stored in the ROM (Read Only Memory) 103. Alternatively, the CPU 102 loads into a RAM (Random Access Memory) 104 the program that is stored in the hard disk 105, the program that is transmitted through a satellite or a network, received at the communicating part 108, and installed in the hard disk 105, or the program that is read out of the removable recording medium 111 mounted on a drive 109 and installed into the hard disk 105 for implementation. Thus, the CPU 102 performs the process steps in accordance with the flow charts described above, or runs the process steps performed by the configurations in the block diagrams shown. Then, the CPU 102 outputs the process results from an output part 106 configured of an LCD (Liquid Crystal Display) and a speaker through the I/O interface 110, etc., as necessary, or transmits the process results from the communicating part 108, or further records the process results on the hard disk 105.

Here, in the specification, the process steps describing the program to allow the computer to run various processes are not necessarily performed in time series along the order described in flow charts, which include the process steps performed in parallel or separately (for example, parallel processing or processing by an object).

In addition, the program may be processed in a single computer, or may be processed by a plurality of computers in distributed processing. Furthermore, the program may be forwarded to a remote computer for implementation.

Moreover, an embodiment of the invention is not limited to the embodiments described above, which can be modified within the scope not deviating from the teaching of an embodiment of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a field forming unit for subjecting 3-2 pulldown materials to 3-2 pulldown to form field images in normal reproduction, and for adding flag information to the individual formed field images, the flag information being necessary to generate frame images from field images based on the flag information added to the 3-2 pulldown materials; and
a generating unit for generating frame images from the field images formed by the field forming means based on the flag information added to the field images,
wherein in a special reproduction other than the normal reproduction, according to a reproduction form, the field forming unit forms a predetermined number of field images from the 3-2 pulldown material without performing 3-2 pulldown, and adds flag information to the individual formed field images, the flag information that has to be added to a field image possibly formed by subjecting the 3-2 pulldown material corresponding to the field image to 3-2 pulldown, and
the generating unit generates a frame image from the field image based on the flag information added to the field image.

2. The image processing apparatus according to claim 1, wherein the generating unit determines whether the field image is formed from the 3-2 pulldown material based on the flag information added to the field image formed by the field forming means, and
when the generating unit determines that the field image is formed from the material through 3-2 pulldown, it generates a frame image from the field image based on the flag information added to the field image.

3. The image processing apparatus according to claim 1, wherein in the case of slow reproduction, slow reverse reproduction, frame advance reproduction, or frame rewind reproduction, the field forming unit forms two field images from each of progressive pictures.

4. The image processing apparatus according to claim 1, wherein in the case of N× speed,
the field forming unit generates a field image from the 3-2 pulldown material so that a ratio to the number of field images formed from the 3-2 pulldown materials is N in accordance with the number of field images that can be formed through 3-2 pulldown and N× reproduction.

5. An image processing method comprising:
subjecting 3-2 pulldown materials to 3-2 pulldown to form field images in normal reproduction, and adding flag information to the individual formed field images, the flag information being necessary to generate frame images from field images based on the flag information added to the 3-2 pulldown materials; and
generating frame images from the field images formed in the process of the field forming step based on the flag information added to the field images,
wherein in a special reproduction other than the normal reproduction, according to a reproduction form, in the field forming step, a predetermined number of field images is formed from the 3-2 pulldown material without performing 3-2 pulldown, and flag information is added to the individual formed field images, the flag information that has to be added to a field image possibly formed by subjecting the 3-2 pulldown material corresponding to the field image to 3-2 pulldown, and
in the generating step, a frame image is generated from the field image based on the flag information added to the field image.

6. A computer-readable medium storing instructions, which, when executed on a processor, perform an image processing method comprising:
subjecting 3-2 pulldown materials to 3-2 pulldown to form field images in normal reproduction, and adding flag information to the individual formed field images, the flag information being necessary to generate frame images from field images based on the flag information added to the 3-2 pulldown materials; and
generating frame images from the field images formed in the process of the field forming step based on the flag information added to the field images,
wherein in a special reproduction other than the normal reproduction, according to a reproduction form, in the field forming step, a predetermined number of field images is formed from the 3-2 pulldown material without performing 3-2 pulldown, and flag information is added to the individual formed field images, the flag information that has to be added to a field image possibly formed by subjecting the 3-2 pulldown material corresponding to the field image to 3-2 pulldown, and
in the generating step, a frame image is generated from the field image based on the flag information added to the field image.

7. An image processing apparatus comprising:
a field forming means configured to subject 3-2 pulldown materials to 3-2 pulldown to form field images in normal reproduction, and to add flag information to the individual formed field images, the flag information being necessary to generate frame images from field images based on the flag information added to the 3-2 pulldown materials; and
a generating means configured to generate frame images from the field images formed by the field forming unit based on the flag information added to the field image,
wherein in a special reproduction other than the normal reproduction, according to a reproduction form, the field forming unit forms a predetermined number of field images from the 3-2 pulldown material without performing 3-2 pulldown, and adds flag information to the individual formed field images, the flag information that has to be added to a field image possibly formed by subjecting the 3-2 pulldown material corresponding to the field image to 3-2 pulldown, and
the generating means generates a frame image from the field image based on the flag information added to the field image.

* * * * *